US011658516B2

(12) United States Patent
Olgun et al.

(10) Patent No.: US 11,658,516 B2

(45) Date of Patent: May 23, 2023

(54) WIRELESS COMMUNICATION APPARATUS FOR RF CHARGING ENCLOSURES

(71) Applicant: SNAP INC., Santa Monica, CA (US)

(72) Inventors: Ugur Olgun, Venice, CA (US); Patrick Timothy McSweeney Simons, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 244 days.

(21) Appl. No.: 16/999,175

(22) Filed: Aug. 21, 2020

(65) Prior Publication Data

US 2021/0083523 A1 Mar. 18, 2021

Related U.S. Application Data

(60) Provisional application No. 62/900,953, filed on Sep. 16, 2019.

(51) Int. Cl.

*H02J 50/20* (2016.01)
*H02J 50/90* (2016.01)
*H02J 50/00* (2016.01)

(52) U.S. Cl.

CPC ............ *H02J 50/20* (2016.02); *H02J 50/005* (2020.01); *H02J 50/90* (2016.02)

(58) Field of Classification Search

CPC .......... H02J 50/20; H02J 50/005; H02J 50/90; H02J 50/70; H02J 7/0044; H02J 50/23; H01Q 1/22; H01Q 5/335; H04W 84/12

See application file for complete search history.

(56) References Cited

U.S. PATENT DOCUMENTS

| | | | | |
|---|---|---|---|---|
| 10,651,670 B1 * | 5/2020 | Jiang | ........................ | H02J 50/40 |
| 11,411,611 B2 * | 8/2022 | Wobak | ................. | H04B 5/0037 |
| 2012/0194125 A1 * | 8/2012 | Kanasugi | ................ | H02J 50/90 320/108 |

FOREIGN PATENT DOCUMENTS

WO WO-2009151732 A1 * 12/2009 .............. H02J 17/00

OTHER PUBLICATIONS

International Search Report and Written Opinion for International Application No. PCT/US2020/047307, dated Oct. 13, 2020 (Oct. 13, 2020)—11 pages.

Office Of Spectrum Management: "United States Frequency Allocations" Oct. 31, 2003 (Oct. 31, 2003), 1 pages, XP055735645, Retrieved from the Internet: URL:https://www.ntia.doc.gov/files/ntia/pu blications/2003-allochrt.pdf.

* cited by examiner

*Primary Examiner* — Stacy Whitmore

(74) *Attorney, Agent, or Firm* — Culhane Meadows PLLC; Stephen J. Weed

(57) ABSTRACT

A RF wireless charging enclosure configured to enable efficient wireless charging of a CE device in the enclosure while also allowing wireless communication of the CE device to devices outside the enclosure. In one example, time multiplexing is used such that the CE device is enabled to either be charged, or to communicate with a device outside the enclosure. In another example, frequency division is used such that the CE device is charged at a first frequency, and simultaneously communicates through the enclosure at a second different frequency.

20 Claims, 4 Drawing Sheets

WIRELESS COMMUNICATION APPARATUS FOR RF CHARGING ENCLOSURES

CROSS-REFERENCE TO RELATED APPLICATIONS

This application claims priority to U.S. Provisional Application Ser. No. 62/900,953 entitled WIRELESS COMMUNICATION APPARATUS FOR RF CHARGING ENCLOSURES, filed on Sep. 16, 2019, the contents of which are incorporated fully herein by reference.

TECHNICAL FIELD

The present subject matter relates to wireless charging, e.g., RF power chargers.

BACKGROUND

Wireless power transfer based on microwave coupling is gaining popularity in the consumer electronics marketplace as a step of moving away from the inductively coupled wireless and traditional cabled solutions. These systems rely on the high frequency (e.g., $f_c$>300 MHz) electromagnetic coupling to provide power transfer between two resonant antennas, one of which is a transmitter and the other one is a receiver.

BRIEF DESCRIPTION OF THE DRAWINGS

The drawing figures depict one or more implementations, by way of example only, not by way of limitations. In the figures, like reference numerals refer to the same or similar elements.

FIG. 4 illustrates a CE device allowed to communicate with a device outside the enclosure when the switch is on;

DETAILED DESCRIPTION

Figure 1:
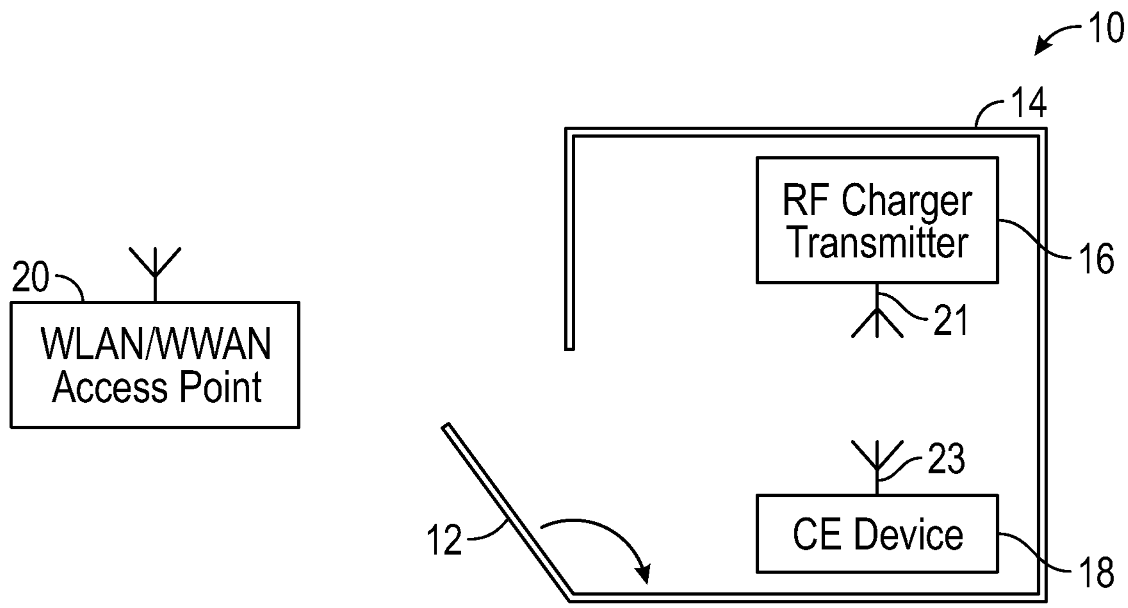
FIG. 1 is a block diagram of a RF charging enclosure having an electronic door.

An RF wireless charging enclosure is configured to enable efficient wireless charging of a consumer electronic (CE) device in the enclosure while also allowing wireless communication of the CE device to devices outside the enclosure. In one example, time multiplexing is used such that the CE device is enabled to either be charged, or to communicate with a device outside the conductive enclosure. In another example, frequency division is used such that the CE device is charged at a first frequency, and simultaneously communicates through the enclosure at a second different frequency.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Presently, a significant portion of the CE devices run on rechargeable batteries that are typically reenergized via cable-based charging solutions. However, there is a growing interest in eliminating the physical connections needed for these ubiquitous cable-based charging solutions since they limit the flexibility of the design and introduce complications to the mechanical integrity of the CE device. The technology trend is to replace these cable-based charging solutions with wireless charging systems.

Wireless power transfer based on inductive coupling is gaining popularity in the consumer electronics marketplace as a concrete step of moving away from the cabled solutions. These systems rely on low frequency electromagnetic coupling to provide power transfer between two planar coils, one of which is a transmitter and the other one is a receiver. This charging scheme is a limited solution as the user experience can be frustrating due to the stringent alignment and spacing requirements between the transmitter and receiver coils. Additionally, high permeability ferrite sheets used for inductive charging adds thickness and weight to the end device.

A radio frequency (RF) wireless charging solution that is efficient addresses both of these concerns. Since many modern CE devices have RF wireless radios in them, some of the wireless infrastructure can be reused (such as the antenna) and thus eliminate some of the weight and space concerns. The inherent nature of RF near field coupling allows significant versatility improvement over inductive charging in how the receiver is placed with respect to the wireless power transmitter. A drawback with this versatility is the lost power transmission efficiency if the receiver and the transmitter are not in a shielded environment, as some of the RF energy sent by the transmitter radiates away from the intended target. Companies have introduced carefully designed cavities and faraday cages that keep the entirety of the transmitted energy inside the enclosure which allows the receiver to capture RF energy with maximum efficiency.

In one example, a wireless charging system includes a metal enclosure having a metal lid and an embedded transmitter. The system becomes operational when the metal lid is closed. The closed off enclosure ensures that the energy sent by the transmitter has nowhere to go but to a receiver of a CE device placed in the enclosure, which in turn uses that power to energize the rechargeable batteries. This efficiency improvement comes at a cost, in that, now the receiving CE device is inside a metal enclosure and has no wireless access to the outside world during charging.

This disclosure includes a RF wireless charging enclosure configured to enable efficient wireless charging of a CE device while also allowing wireless communication of the CE device to devices outside the enclosure.

In order for the receiving CE device to communicate with the outside world while in a confined metal enclosure, such as copper in one example, physical openings are formed in the walls of the enclosure. These physical openings will result in energy leakage if they are too big when RF wireless charging is happening. If the openings are too small, then the wireless communication of the CE device with the external world will be severely impaired. As such, a physical opening is needed that is big enough when the CE device is communicating, and as small as possible when wirelessly charging the CE device. In simple terms, an electronic switchable door on the metal enclosure enables such behavior as shown in FIG. 1.

In the example shown in FIG. 1, an RF charging system 10 is time-duplexed, in that an electronically switchable door 12 of enclosure 14 is closed when an RF charger transmitter 16 is wirelessly charging the CE device 18, and then opened when the CE device 18 needs to communicate with the outer world, such as with a wireless local area network/wireless wide area network (WLAN/WWAN) access point 20. In one example, this electronic door 12 is opened and closed within milliseconds for a modern time duplexing system to be functional.

Figure 2:
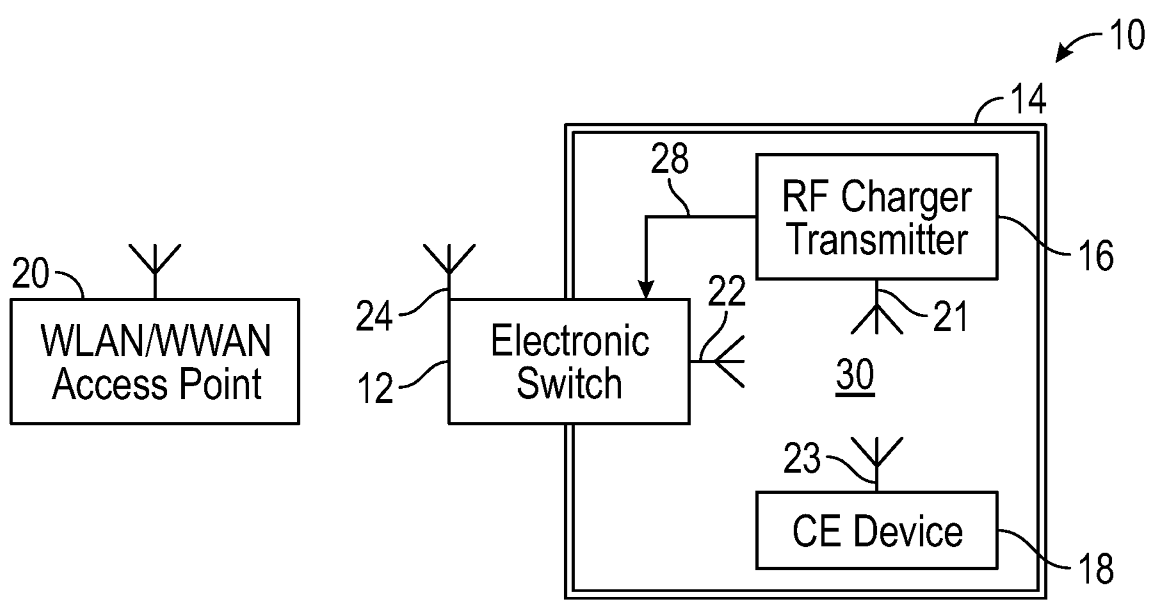
FIG. 2 is a block diagram of a RF charging enclosure having an electronic switch.

FIG. 2 illustrates an electronic switch operating as the switchable door 12 to provide time duplexed charging and wireless communication. When the wireless charging of CE device 18 is occurring using transmitter antenna 21 and CE device antenna 23, the electronic switch 12 disconnects an antenna 22 inside the enclosure 14 from an antenna 24 on the outside of the enclosure 12. This switch 12 ensures that the RF energy leakage from the enclosure 14 during charging is minimized as the charging energy has nowhere to go from the transmitter 16 but to the CE device 18. When it is time for the CE device 18 to communicate with the outer world, and the transmitter 16 is not enabled, this electronic switch 12 connects the two antennas 22 and 24 to provide a reliable RF link between an antenna 26 of the CE device 18 and the WLAN/WWAN access point 20. In one example, the RF charger transmitter 16 sends a control signal on control line 28 that controls the connection of the antennas 22 and 24 such that they are disconnected when the RF charger transmitter 16 is transmitting RF power, and connected when the RF charger transmitter 16 is off. The antennas 22 and 24 of the electronic switch 12 are designed with consideration of the electromagnetic properties of the enclosure cavity 30 and are properly matched with respect to their electrical impedance. The antennas 22 and 24 are passive, and are operatively connected to each other when the transmitter 16 is not active and not charging the CE device 18. The antennas 22 and 24 could be high bandwidth patch type antennas that are tuned to operate inside the cavity and in the free space, respectively. Antennas 22 and 24 are not necessarily designed to be 50 ohms but designed to the impedance that allows maximum energy extraction from the enclosure cavity when connected.

Figure 3:
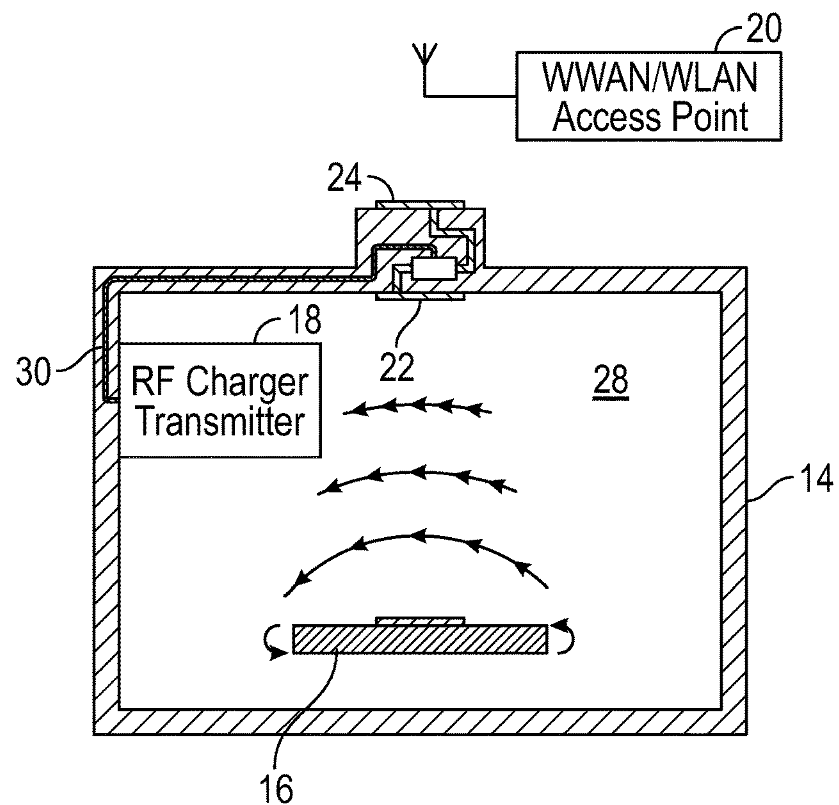
FIG. 3 illustrates a CE device prevented from communicating with a device outside the enclosure when the switch is off.

As seen in FIG. 3, when the electronic switch 12 is off during charging, there is no communication between the antenna 22 on the inside of the enclosure 14 and the antenna 24 on the outside of the enclosure. Thus, the CE device 18 cannot communicate with the WLAN/WWAN access point 20. The RF charging energy is contained inside the wireless charging enclosure 14.

Figure 4:
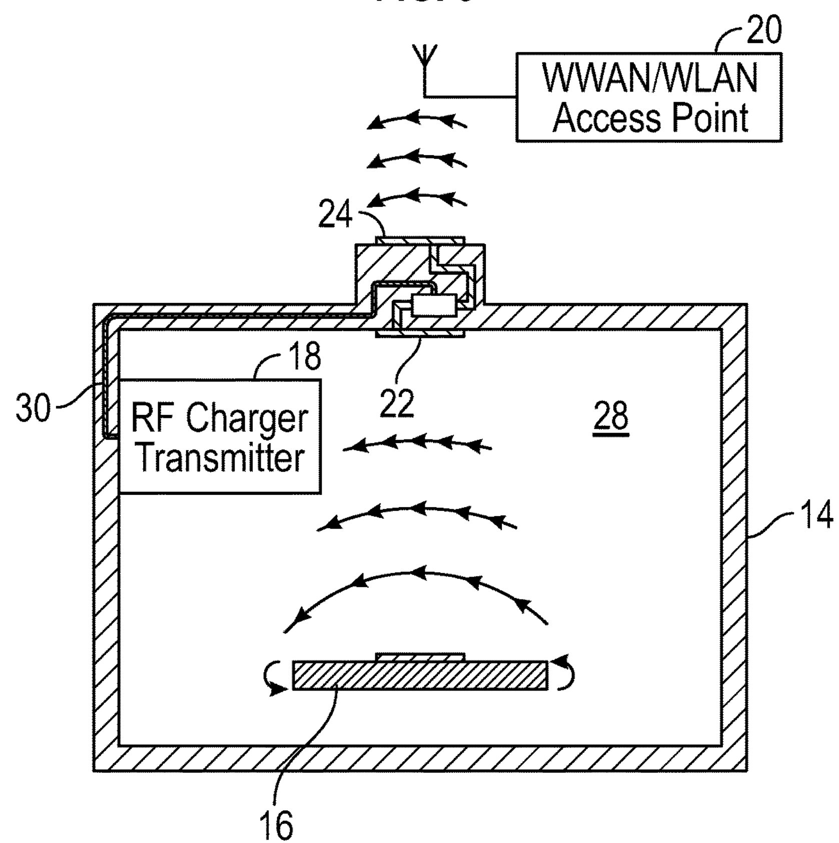

However, as shown in FIG. 4, when the electronic switch 12 opens, such as when the RF charger transmitter 16 is off, the antenna 24 on the perimeter of the enclosure 14 is connected with the antenna 22 inside of the enclosure. Now, the CE device 18 can wirelessly communicate with WLAN/WWAN access point 20 via antenna 22 and antenna 24.

Figure 5:
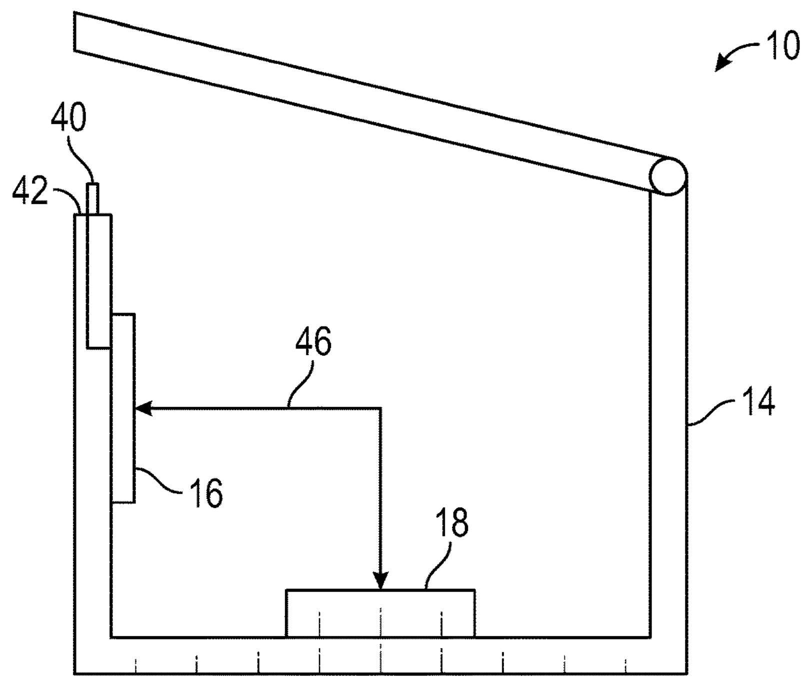
FIG. 5 illustrates the enclosure having a lid and a sensor configured to determine when the lid is closed.
Figure 6:
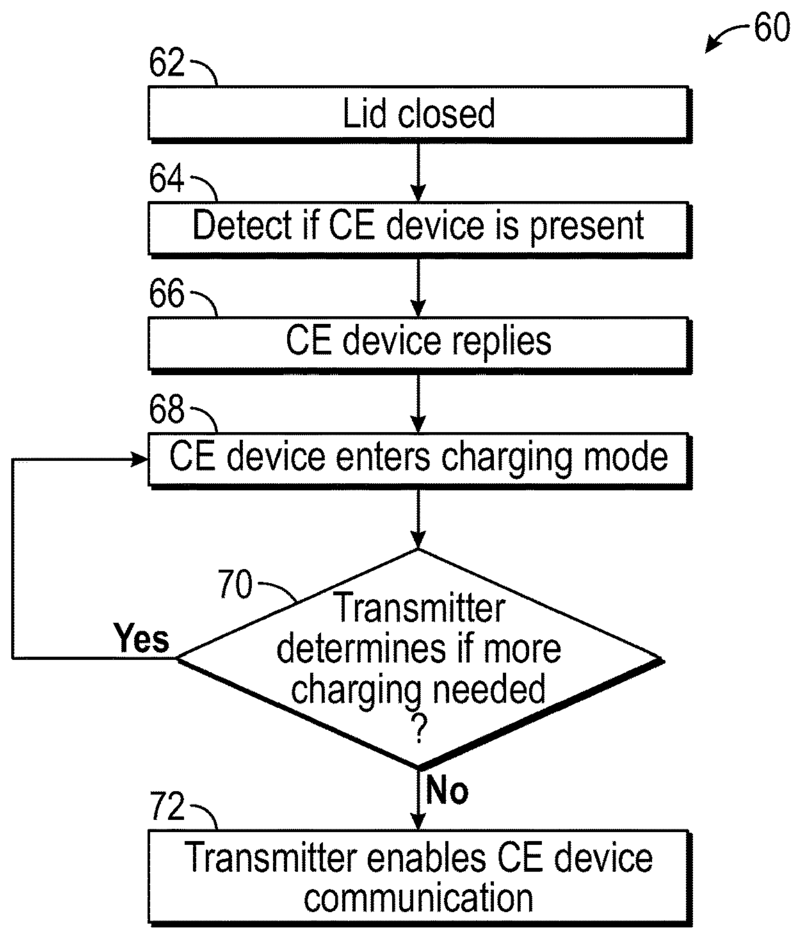
FIG. 6 illustrates a method of charging a CE device in the enclosure.

There are multiple methods to implement the time-duplexed charging scheme described. FIG. 5 and FIG. 6 illustrate one example, where an enclosure switch 40 extending upwardly on the upper rim 42 of the enclosure 14 is compressed and closed when a metal enclosure lid 44 is closed. Once the transmitter 16 detects that the switch 40 is closed, the transmitter 16 will control the electronic switch 12 to go to its default position, the off state, where RF communication between inside the enclosure 14 and outside the enclosure 14 is not allowed.

Referring to the method 60 shown in FIG. 6, at block 62 the lid 44 closed by a user to enclose the CE device 18 in the enclosure.

At block 64, the RF transmitter 16 detects if a CE device 18 is present in the enclosure 14. In one example, the RF transmitter 16 sends a low amplitude RF charge signal for a certain amount of time via antenna 21, for example 2 seconds, and then moves on to its listening mode. If the RF transmitter 16 does not get a response back from the CE device 18 in the listening mode, this means there is no CE device 18 present and the RF transmitter 16 will shut off until the next lid closure event. In the meantime, the CE device 18 frequently checks if there is a charging signal coming in as it has a logic that allows it to switch its antenna 23 between its RF radio and RF charger. The switching frequency should be less than the wait time of the RF transmitter 16, in this example 2 seconds.

At step 66, once the CE device 18 detects that it is in a charging environment, as it received the low amplitude charging signal from the transmitter 16 via antenna 23, it replies back and tells the RF transmitter 16 its state of battery charge and the temperature of its critical components over an RF link 46. This RF link 46 can be a simple modulation scheme with no security (as simple as amplitude modulation) as this communication is completely isolated from the outside world.

At block 68, the RF transmitter 16 and the CE device 18 are now in charging mode, and sync their clocks using RF link 46 and agree to RF charge for a certain amount of time and amplitude (say 3 seconds, max amplitude in this example) depending on the state of battery charge and the temperature of the CE device 18 critical components. Switch 12 is off which prevents communication of the RF charge signal from emanating from the enclosure 12 via switch 12.

At block 70, after this set amount of time expires (3 seconds in this example), the RF transmitter 16 switches to listen mode to check in with the CE device 18. The goal is to inquire about state of CE device 18 battery charge, temperature, and if there is a desire to communicate with the outer world. If CE device 18 needs more charging and no desire to communicate with the outer world, the process repeats itself with more RF charging.

At block 72, if the CE device 18 does not need charging anymore, the RF transmitter 16 turns off until the next lid event and informs the electronic switch 12 via control line 30 to go to the "on" state. If CE device 18 needs to communicate with the outer world, the RF transmitter 16 informs the electronic switch 12 that CE device 18 wants to communicate with the outer world and goes to listening mode. Electronic switch 12 then goes to the "on" position and connects the two antennas 22 and 24 to provide a link between outer world and the CE device 18.

At block 74, once CE device 18 is done communicating with the outer world, it sends the state of its battery charge and the temperature of its critical components over the same simple RF link 46 to the RF transmitter 16. RF transmitter 16 was already in the listening mode waiting to be informed if a charging event is needed. Thus, when the charging request comes in, RF transmitter 16 relays to the electronic switch 12 that a charging process is about to start. Electronic switch 12 returns to its off position and RF transmitter 16 again sends an RF charge for that fixed certain amount of time, which was 3 seconds in this example. The process repeats itself as it is negotiated between the RF transmitter 16 and the CE device 18.

Figure 7:
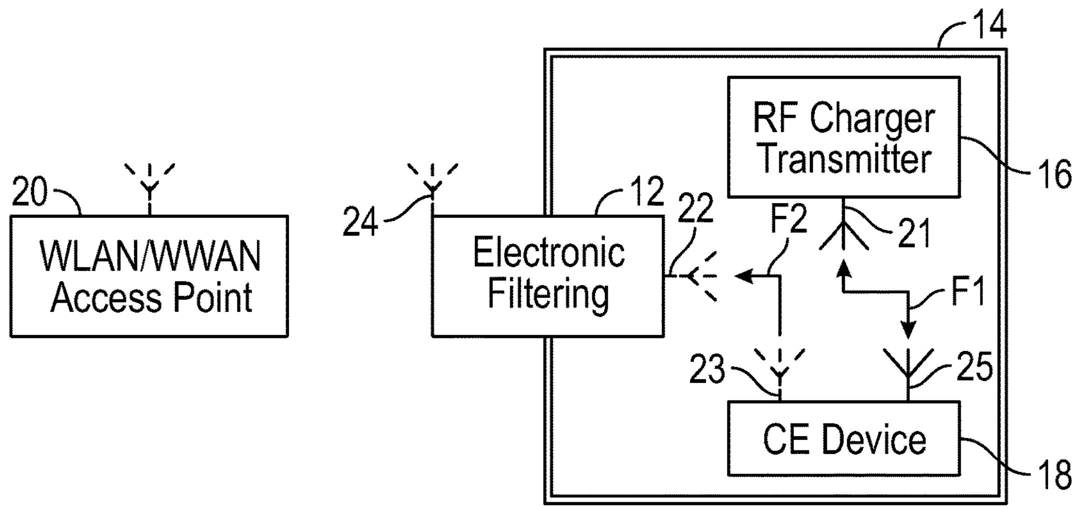
FIG. 7 illustrates frequency diplexing wherein the CE device can be charged at a first frequency and simultaneously communicate at a different second frequency.

In another example, as shown in FIG. 7, frequency duplexing is utilized where the RF charging of CE device 18 is performed using a first frequency f1, and a second different frequency f2 is used for CE device 18 communication. As an example, the RF transmitter 16 performs RF charging at 915 MHz, while the CE device 18 communication operates using 2.4 GHz or 5.2 GHz ISM bands.

As shown in FIG. 7, the CE device 18 communication is done using CE device antenna 23 and antennas 22/24, and RF charging is simultaneously done using a transmitter antenna 21 and a second CE device antenna 25. The electronic switch antennas 22 and 24 are designed to ensure that the RF energy at frequency f1 coming from the RF charger transmitter 16 cannot escape the enclosure 14, while CE device 18 communication at frequency f2 can occur simultaneously. The switch 12 has a bandpass filter with high rejection to allow for wireless communication frequencies f2 to go through the switch 12 from CE device 18 to WLAN/WWAN access point 20, and which bandpass filter blocks the RF charging frequency signals.

Figure 8:
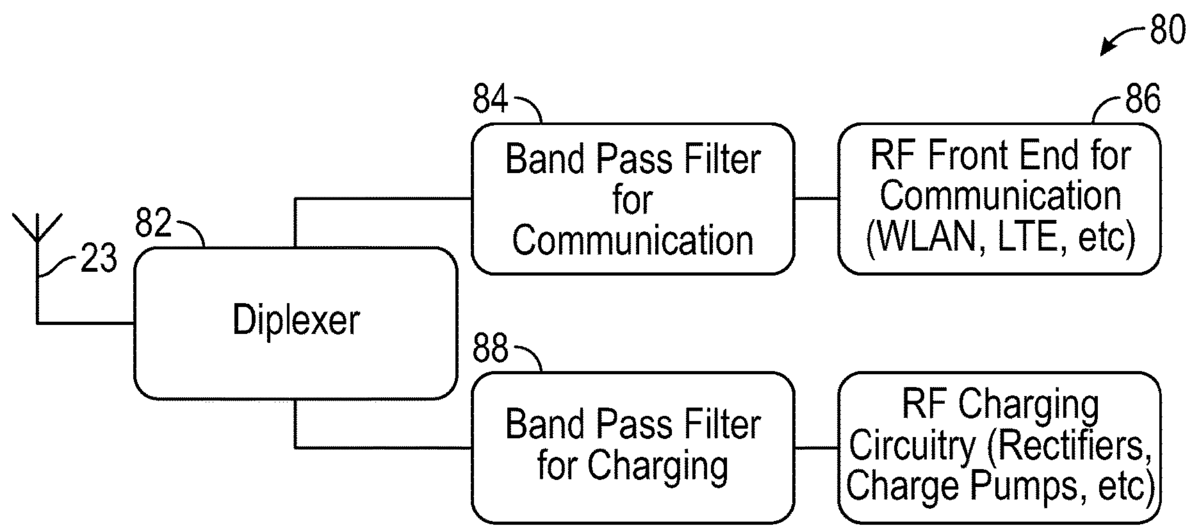
FIG. 8 illustrate frequency diplexing at the front end of a CE device.

Alternatively, the CE device 18 antennas can be combined as a single antenna 23 that has multi-band radiation characteristics. In this scenario, as illustrated in FIG. 8, the CE device 18 utilizes a frequency diplexer 82 in its RF front end to separate the RF charge energy from the RF communication energy in spectral domain. A diplexer is configured to separate frequency bands. A bandpass filter 84 only permits communication of the higher frequency f2 between a RF front end 86 for CE device and antenna 23, and a bandpass filter 88 only permits communication of the RF charging signal at the lower frequency f1 from antenna 23 and RF charging circuitry 90 of the CE device 18.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An RF device charger, comprising:

an enclosure having at least one wall encompassing a cavity, wherein the at least one wall encompassing the cavity is configured to prevent communication of RF signals through the at least one wall;

a RF transmitter configured to generate an RF charge signal within the cavity at a first frequency, the RF charge signal configured to wirelessly charge a device within the cavity; and a switch coupled to the at least one wall and configured to pass an RF communication signal through the at least one wall at a second frequency that is different from the RF charge signal first frequency, and reject communication of the RF charge signal through the at least one wall to prevent the RF charge signal from emanating from the enclosure.

2. The RF device charger of claim 1, wherein the switch is configured to selectively pass the RF communication signal through the at least one wall as a function of a transmission state of the RF transmitter.

3. The RF device charger of claim 1, wherein the enclosure has a first state where the RF transmitter is configured to generate the RF charge signal and the switch prevents communication of the RF communication signal through the switch, and a second state where the RF transmitter is not configured to generate the RF charge signal and the switch permits communication of the RF communication signal through the switch.

4. The RF device charger of claim 1, wherein the enclosure has a third state where the RF transmitter is configured to generate the RF charge signal and the switch permits communication of the RF communication signal through the switch, wherein the switch prevents communication of the RF charge signal through the switch.

5. The RF device charger of claim 4, wherein the switch is a switchable antenna.

6. The RF device charger of claim 5, wherein the switch comprises a first antenna and a second antenna configured to be selectively coupled to each other.

7. The RF device charger of claim 6, wherein the first antenna is exposed to inside the cavity and the second antenna is exposed to outside the enclosure.

8. The RF device charger of claim 6, wherein the first antenna and the second antenna are impedance matched.

9. The RF device charger of claim 6, wherein the first antenna and the second antenna are passive.

10. The RF device charger of claim 1, wherein the enclosure is comprised of a metal material.

11. A method of RF charging a device in an RF device charger, comprising:

an enclosure having at least one wall encompassing a cavity, wherein the at least one wall encompassing the cavity is configured to prevent communication of RF signals through the at least one wall;

a RF transmitter configured to generate an RF charge signal within the cavity at a first frequency, the RF charge signal configured to wirelessly charge a device within the cavity; and a switch coupled to the at least one wall and configured to pass an RF communication signal through the at least one wall at a second frequency that is different from the RF charge signal first frequency, and reject communication of the RF charge signal through the at least one wall to prevent the RF charge signal from emanating from the enclosure;

comprising the steps of:

placing the device in the enclosure; and

RF charging the device in the enclosure, wherein the switch passes the RF communication signal through the at least one wall at the second frequency that is different from the RF charge signal first frequency, and rejects communication of the RF charge signal through the at least one wall to prevent the RF charge signal from emanating from the enclosure.

12. The method of claim 11, wherein the switch selectively passes the RF communication signal through the at least one wall as a function of a transmission state of the RF transmitter.

13. The method of claim 11, wherein the enclosure has a first state where the RF transmitter is configured to generate the RF charge signal and the switch prevents communication of the RF communication signal through the switch, and a second state where the RF transmitter is not configured to generate the RF charge signal and the switch permits communication of the RF communication signal through the switch.

14. The method of claim 11, wherein the enclosure has a third state where the RF transmitter is configured to generate the RF charge signal and the switch permits communication of the RF communication signal through the switch, wherein the switch prevents communication of the RF charge signal through the switch.

15. The method of claim 14, wherein the switch is a switchable antenna.

16. The method of claim 15, wherein the switch comprises a first antenna and a second antenna configured to be selectively coupled to each other.

17. The method of claim 16, wherein the first antenna is exposed to inside the cavity and the second antenna is exposed to outside the enclosure.

18. The method of claim 16, wherein the first antenna and the second antenna are impedance matched.

19. The method of claim 16, wherein the first antenna and the second antenna are passive.

20. The method of claim 16, wherein the enclosure is comprised of a metal material.

* * * * *